G. B. GUINAND.
DEFECT INDICATOR FOR STEERING MECHANISMS.
APPLICATION FILED AUG. 24, 1914.
1,170,633.
Patented Feb. 8, 1916.
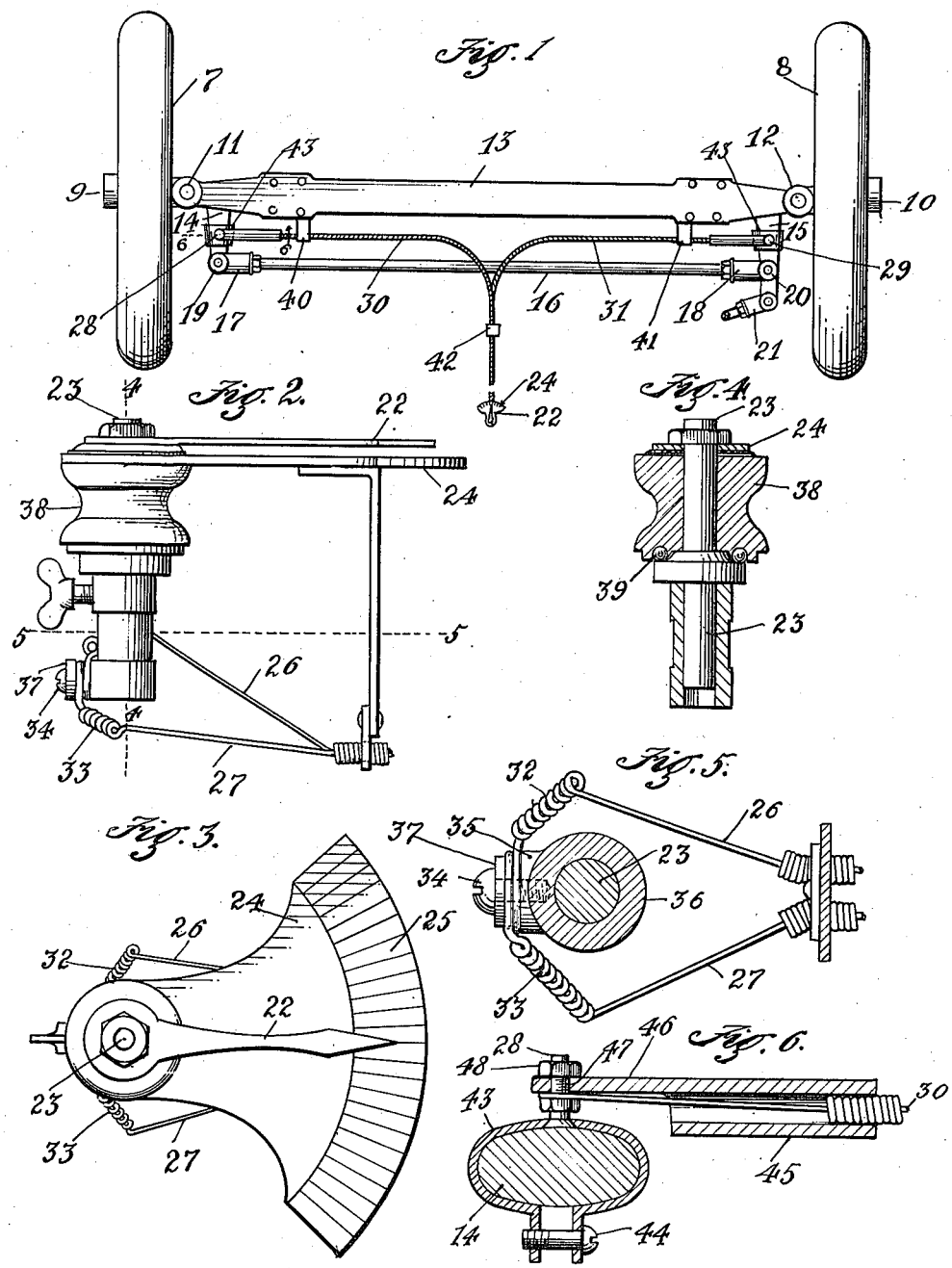

UNITED STATES PATENT OFFICE.

GUSTAVIUS B. GUINAND, OF LOS ANGELES, CALIFORNIA.

DEFECT-INDICATOR FOR STEERING MECHANISMS.

1,170,633. Specification of Letters Patent. Patented Feb. 8, 1916.

Application filed August 24, 1914. Serial No. 858,400.

*To all whom it may concern:*

Be it known that I, GUSTAVIUS B. GUINAND, a citizen of the United States, residing at Los Angeles, in the county of Los Angeles, State of California, have invented new and useful Improvements in Defect-Indicators for Steering Mechanisms, of which the following is a specification.

This invention relates to a device for indicating defects in the steering mechanisms of power propelled vehicles, such as automobiles and the like.

It is the object of this invention to provide an attachment for automobiles and similar vehicles by means of which defects such as bent wheel spindles and excessive lost motion in the connections and mountings of the front wheels of the vehicle may be readily detected so as to enable the quick remedying of such defects and thereby prevent excessive wear on the tires due to wabbling movement of the wheels caused by such defects.

A further object is to provide a device of the above character which is simple in construction and which may be readily applied to a vehicle without altering the construction thereof.

The invention is illustrated in the accompanying drawings, in which:

Figure 1 is a plan view of the forward running gear of an automobile showing the invention as applied. Fig. 2 is a view in side elevation of the indicating device. Fig. 3 is a plan view of same. Fig. 4 is a detail vertical section on the line 4—4 of Fig. 2, partly in elevation. Fig. 5 is a detail horizontal section on the line 5—5 of Fig. 2. Fig. 6 is an enlarged detail section on the line 6—6 of Fig. 1.

More specifically, 7 and 8 indicate the front wheels of the running gear of an automobile mounted on the usual wheel spindles 9 and 10 carried by the knuckles 11 and 12 supported on the forward axle 13, and which knuckles are provided with the usual rearwardly extending arms 14 and 15 which are connected together by means of a transverse rod 16; the ends of the rod 16 being attached to yokes 17 and 18 which are pivotally engaged with the arms 14 and 15 by means of bolts 19 and 20 in the usual manner. The arm 15 is extended beyond its connection with the yoke 18 and is attached at its outer end to the usual connection 21 leading to the steering wheel, not shown, by which the arms 14 and 15 are swung horizontally from side to side to rock the wheels 7 and 8 simultaneously in steering the vehicle.

It is essential that the wheels 7 and 8 be arranged in true parallel alinement with each other and that there be no excessive lost motion in their connection in order to prevent lateral wabbling movement of the wheels when the vehicle is in motion. Such movement of the wheels is objectionable in that it causes an excessive wear of the tires by reason of the grinding action thereon.

It frequently occurs that the wheel spindles 9 and 10 become bent on impact of the wheels with an obstruction, thus throwing the wheels out of proper parallel alinement. Excessive wear in the knuckles 11 and 12 and also in the connections between the yokes 17 and 18 and the arms 14 and 15, also acts to throw the wheels out of proper alinement with each other. The present invention resides in a device for indicating such defects so as enable their being quickly remedied and consists in an indicating arrow or pointer 22 mounted on a rock shaft 23 and extending over a plate 24 having a graduated segment 25 formed thereon and connections between the pointer 22 and the arms 14 and 15 whereby movements of the latter will operate to actuate the rock shaft 23 and move the pointer 22 over the plate 24 and the graduations 25 thereon.

The connections between the rock shaft 23 and the arms 14 and 15 consist of a pair of wires 26 and 27 which are attached to studs 28 and 29 on the arms 14 and 15 respectively, and extend through tubes 30 and 31 and are coiled at their outer ends to form spring members 32 and 33 arranged on the opposite sides of the lower end of the rock shaft 23 and are secured to the latter by means of a screw 34 which is threaded in a boss 35 formed on a collar 36 mounted on the lower end of the shaft 23; the ends of the spring members 32 and 33 being wound around the shank of the screw 34 and clamped between the hub 35 and a washer 37 on the screw shank as particularly shown in Fig. 5.

The rock shaft 23 extends through a bearing 38 attached to and projecting downwardly from the underside of the plate 24; suitable anti-friction bearings 39 being interposed between the rock shaft 23 and the bearing 38 to insure free turning movement of the rock shaft. The bearing 38 and the plate 24 may be mounted at any convenient point where the movements of the pointer 22 may be readily seen by the operator of the vehicle, being usually placed either on the steering wheel post or the footboard of the vehicle, not shown. The tubes 30 and 31 are rigidly secured at their lower ends to the forward axle 13 by means of clamps 40 and 41, and are rigidly connected together by means of a clamp 42 secured to the vehicle frame at any suitable point; the tubes 30 and 31 being rigidly mounted so as to have no flexible movement.

The studs 28 and 29 may be mounted directly on the arms 14 and 15, or may be attached to clamps 43 as shown in Fig. 6, which clamps are adapted to embrace the arms 14 and 15 and are secured thereto by means of screws 44. As a means for guarding the connections of the wires 26 and 27 with the studs 28 and 29 shield sleeves 45 are provided, which project over the ends of the tubes 30 and 31 in slidable relation thereto, and are attached at their ends to the studs 28 and 29; the sleeves 45 having extending portions 46 formed with apertures 47 through which the studs project and being held in engagement with the latter by means of nuts 48 screwed thereon.

In the operation of the invention, when the wheels 7 and 8 and the arms 14 and 15 are swung horizontally from side to side a corresponding movement with be transmitted to the pointer 22 through the medium of the wires 26 and 27; the oppositely extending spring members 32 and 33 having sufficient tension and rigidity to actuate the rock shaft. If the wheels 7 and 8 are running true the movements of the pointer 22 will be regular, but in event either of the wheels wabbles by reason of bent spindles or loose connections a vibrating movement will be imparted to the pointer 22 in conjunction with its lateral swinging movement, thus indicating the presence of the objectionable defects.

By forming the spring members 32 and 33 on the wires 26 and 27 relative movement of the arms 14 and 15 to each other causes an erratic movement of the pointer 22; the movement of one of the wires 26 or 27 independent of the other to effect movement of the pointer 22 being permitted by reason of the resiliency of the spring members 32 and 33. Furthermore, by providing the spring members 32 and 33 the wires 26 and 27 may be connected to the rock shaft 23 at various angles according to the direction in which they lead from the shaft, thus permitting a ready adjustment and attachment of the device to the vehicle on which it is to be applied.

What I claim is:

1. A defect indicator, comprising the combination with the steering wheels of a vehicle running gear, of a pivoted pointer, a rock shaft on which said pointer is mounted, and a pair of wires connecting with the opposite sides of said rock shaft and leading to and connecting with the wheel mountings, whereby wabbling movement of the wheels will cause a vibration of the pointer.

2. A defect indicator, comprising the combination with the steering wheels of a vehicle running gear and the connected steering arms thereof, of a pointer, a rock shaft on which the pointer is mounted, a pair of wires connecting with the steering arms, and resilient connections between said wires and the rock shaft, whereby movement of one of the arms in relation to the other will effect a corresponding movement of the pointer.

In witness that I claim the foregoing I have hereunto subscribed my name this 3rd day of August, 1914.

G. B. GUINAND.

Witnesses:
 MARGUERITE BATES,
 MARIE BATTEY.